United States Patent
Vinciarelli

(10) Patent No.: US 9,325,247 B1
(45) Date of Patent: Apr. 26, 2016

(54) CLAMPED CAPACITOR RESONANT POWER CONVERTER

(71) Applicant: VLT, INC., Sunnyvale, CA (US)

(72) Inventor: Patrizio Vinciarelli, Boston, MA (US)

(73) Assignee: VLT, Inc., Sunnyvale, CA (US)

( * ) Notice: Subject to any disclaimer, the term of this patent is extended or adjusted under 35 U.S.C. 154(b) by 0 days.

(21) Appl. No.: 14/874,054

(22) Filed: Oct. 2, 2015

(51) Int. Cl.
  *H02M 3/335* (2006.01)

(52) U.S. Cl.
  CPC .................. *H02M 3/33507* (2013.01)

(58) Field of Classification Search
  CPC ............. H02M 3/00; H02M 7/003; H02M 2001/0012; H02M 2001/0074; H02M 2001/346; H02M 5/225
  See application file for complete search history.

(56) References Cited

U.S. PATENT DOCUMENTS

| | | | | | |
|---|---|---|---|---|---|
| 4,694,383 | A | * | 9/1987 | Nguyen | H02M 3/3376 363/17 |
| 4,841,220 | A | * | 6/1989 | Tabisz | H02M 3/155 323/235 |
| 4,853,832 | A | * | 8/1989 | Stuart | H02M 3/3376 363/17 |
| 4,953,068 | A | * | 8/1990 | Henze | H02M 3/33584 363/127 |
| 4,975,821 | A | * | 12/1990 | Lethellier | H02M 3/33538 363/21.02 |
| 5,132,889 | A | * | 7/1992 | Hitchcock | H02M 3/337 363/132 |
| 5,198,969 | A | * | 3/1993 | Redl | H02M 3/337 363/132 |
| 5,448,467 | A | * | 9/1995 | Ferreira | H02M 3/3376 363/132 |
| 5,594,635 | A | * | 1/1997 | Gegner | H02M 3/158 363/124 |
| 5,923,547 | A | * | 7/1999 | Mao | H02M 1/34 363/132 |
| 5,946,200 | A | * | 8/1999 | Kim | H02M 1/34 363/132 |
| 6,147,886 | A | * | 11/2000 | Wittenbreder | H02M 3/33592 363/132 |
| 6,310,785 | B1 | * | 10/2001 | Ayyanar | H02M 3/337 363/132 |
| 6,600,402 | B1 | * | 7/2003 | LaFleur | H01F 27/22 336/198 |
| 6,930,893 | B2 | | 8/2005 | Vinciarelli | |
| 7,145,786 | B2 | | 12/2006 | Vinciarelli | |
| 7,545,369 | B1 | * | 6/2009 | Lan | G09G 3/3406 315/209 R |
| 7,561,446 | B1 | * | 7/2009 | Vinciarelli | H02M 1/34 363/16 |
| 7,598,792 | B2 | * | 10/2009 | Liu | H02M 1/08 327/494 |
| 7,859,870 | B1 | * | 12/2010 | Schutten | H02M 3/337 363/132 |
| 8,441,815 | B2 | * | 5/2013 | Mayell | H02M 3/335 363/18 |
| 8,669,744 | B1 | * | 3/2014 | Vinciarelli | H02M 3/1582 323/235 |

(Continued)

OTHER PUBLICATIONS

Watson, Robert III, New Techniques in the Design of Distributed Power Systems, printed from Internet address: http://scholar.lib.vt.edu/theses/available/etd-71398-22552/ on Jun. 10, 2008, 32 pages.

*Primary Examiner* — Timothy J Dole
*Assistant Examiner* — Yusef Ahmed
(74) *Attorney, Agent, or Firm* — Foley & Lardner LLP

(57) ABSTRACT

A power converter including a transformer, a resonant circuit including the transformer and a resonant capacitor having a characteristic resonant frequency and period, and output circuitry connected to the transformer for delivering a rectified output voltage to a load. Primary switches drive the resonant circuit, a clamp switch is connected to shunt the resonant capacitor, and a switch controller operates the primary switches and the clamp switch in a series of converter operating cycles. The converter operating cycles include power transfer intervals including resonant intervals during which a resonant current at the characteristic resonant frequency flows through a winding of the transformer; and a clamp interval during which the clamp switch provides a low impedance shunt across the resonant capacitor holding the resonant capacitor at a voltage at or near zero volts. The operating cycles may also include energy recycling intervals for charging and discharging capacitances within the converter.

25 Claims, 3 Drawing Sheets

(56) References Cited

U.S. PATENT DOCUMENTS

| | | | |
|---|---|---|---|
| 9,112,422 B1 | 8/2015 | Vinciarelli | |
| 2002/0054498 A1* | 5/2002 | Cho | H02M 3/3376 363/132 |
| 2002/0075698 A1* | 6/2002 | Kuranuki | H02M 1/34 363/17 |
| 2003/0142513 A1* | 7/2003 | Vinciarelli | H02J 1/102 363/17 |
| 2004/0027101 A1* | 2/2004 | Vinciarelli | H02M 3/1582 323/259 |
| 2004/0183513 A1* | 9/2004 | Vinciarelli | H02M 1/088 323/284 |
| 2005/0254272 A1* | 11/2005 | Vinciarelli | H02M 3/157 363/65 |
| 2007/0025125 A1* | 2/2007 | Nakahori | H02M 1/32 363/56.02 |
| 2008/0123374 A1* | 5/2008 | Vinciarelli | H02M 3/33592 363/65 |
| 2008/0247194 A1* | 10/2008 | Ying | H02M 3/3376 363/17 |
| 2009/0046482 A1* | 2/2009 | Smith | H02M 3/33569 363/17 |
| 2010/0246214 A1* | 9/2010 | Nakahori | H02M 1/34 363/17 |
| 2011/0194206 A1* | 8/2011 | Sase | H02M 3/33592 360/75 |
| 2015/0288289 A1* | 10/2015 | Qu | H02M 3/33546 363/17 |

* cited by examiner

CLAMPED CAPACITOR RESONANT POWER CONVERTER

TECHNICAL FIELD

This invention relates to the field of electrical power conversion and more particularly to resonant switching power converters.

BACKGROUND

Resonant switching power converters may be used as fixed ratio bus converters in power conversion systems to provide scaling of voltages and currents and optionally galvanic isolation.

SUMMARY

One exemplary method of converting power between an input source and a load may include forming a resonant circuit having a characteristic resonant frequency and period which includes a transformer and a resonant capacitor. Output circuitry connected to the transformer may be provided for delivering a rectified output voltage to the load. The method may include providing: two or more primary switches to drive the resonant circuit, a clamp switch to clamp the resonant capacitor, and a switch controller to operate the primary switches and the clamp switch in a series of converter operating cycles. The converter operating cycle may include (a) power transfer intervals during which one or more of the primary switches are ON, a magnetizing current flows in a winding of the transformer, and power is transferred between the input and the output via the transformer. The power transfer intervals may include (i) resonant intervals, having a duration less than the characteristic resonant period, during which a resonant current flows through a winding of the transformer at the characteristic resonant frequency; and (ii) a clamp interval occurring between resonant intervals, during which the clamp switch is ON and provides a low impedance shunt across the resonant capacitor.

Another exemplary method of converting power between an input source and a load may include forming a resonant circuit having a characteristic resonant frequency and period which includes an inductor and a resonant capacitor. Output circuitry connected to the resonant circuit may be provided for delivering a rectified output voltage to the load. The method may include providing a primary switch to drive the resonant circuit, a clamp switch to clamp the resonant capacitor, and a switch controller to operate the primary switch and the clamp switch in a series of converter operating cycles. The converter operating cycle may include: (a) one or more power transfer intervals each having (i) a resonant interval and a clamp interval. The resonant intervals may have a duration less than the characteristic resonant period, or approximately equal to quarter of the resonant period. During the resonant interval, a resonant current may flow through the inductor at the characteristic resonant frequency and power is transferred between the input and the output via the resonant circuit or the output current may change sinusoidally from zero to a first value. The clamp interval may have a clamp duration during which the clamp switch is ON and provides a low impedance shunt across the resonant capacitor and power may be transferred between the input and the output via the inductor, or the output current may continue to flow.

One exemplary apparatus for converting power between an input source and a load may include a resonant circuit including a transformer and a resonant capacitor and having a characteristic resonant frequency and period, output circuitry connected to the transformer for delivering a rectified output voltage to the load, primary switches to drive the resonant circuit, a clamp switch to clamp the resonant capacitor, and a switch controller to operate the primary switches and the clamp switch in a series of converter operating cycles. The converter operating cycle may include (a) power transfer intervals during which one or more of the primary switches are ON, a magnetizing current flows in a winding of the transformer, and power is transferred between the input and the output via the transformer. The power transfer intervals may include (i) resonant intervals, having a duration less than the characteristic resonant period, during which a resonant current flows through a winding of the transformer at the characteristic resonant frequency; and (ii) a clamp interval occurring between resonant intervals, during which the clamp switch is ON and provides a low impedance shunt across the resonant capacitor.

In alternative methods and apparati: the converter operating cycles may further include one or more energy-recycling intervals, during which the primary switches are OFF and currents in the converter are used to charge and discharge capacitances in the converter; the switch controller may adjust the duration of the clamp interval, the energy recycling interval, or both, as a function of power delivered to the load, input current, or output current; and the switch controller may maintain an essentially constant operating frequency over a range of operating conditions.

DETAILED DESCRIPTION

A category of isolated DC transformer topologies, called Sine Amplitude Converters ("SACs"), are described in Vinciarelli, Factorized Power Architecture with Point of Load Sine Amplitude Converters, U.S. Pat. No. 6,930,893 issued Aug. 16, 2005; and in Vinciarelli, Point of Load Sine Amplitude Converters and Methods, U.S. Pat. No. 7,145,786 issued on Dec. 5, 2006, each assigned to VLT, Inc. and incorporated herein by reference in their entirety (the "SAC patents"). As disclosed in the SAC patents, a SAC operating cycle comprises two energy transfer intervals, during which energy is transferred to the output by means of a substantially sinusoidal current characterized by a resonant frequency determined by component values within the SAC, and two energy recycling intervals (referred to herein as a "ZVS intervals") during which a transformer magnetizing current charges and discharges capacitances within the converter, thereby reducing or eliminating converter switching losses. As also disclosed and illustrated in the SAC patents, the waveform of the rectified transformer secondary current in such a converter comprises a series of unidirectional half-sinusoidal pulses separated from one another by a ZVS interval. The amplitude of the half-sinusoidal pulses increases with increasing load and the operating frequency of the converter may be substantially constant.

Figure 1:
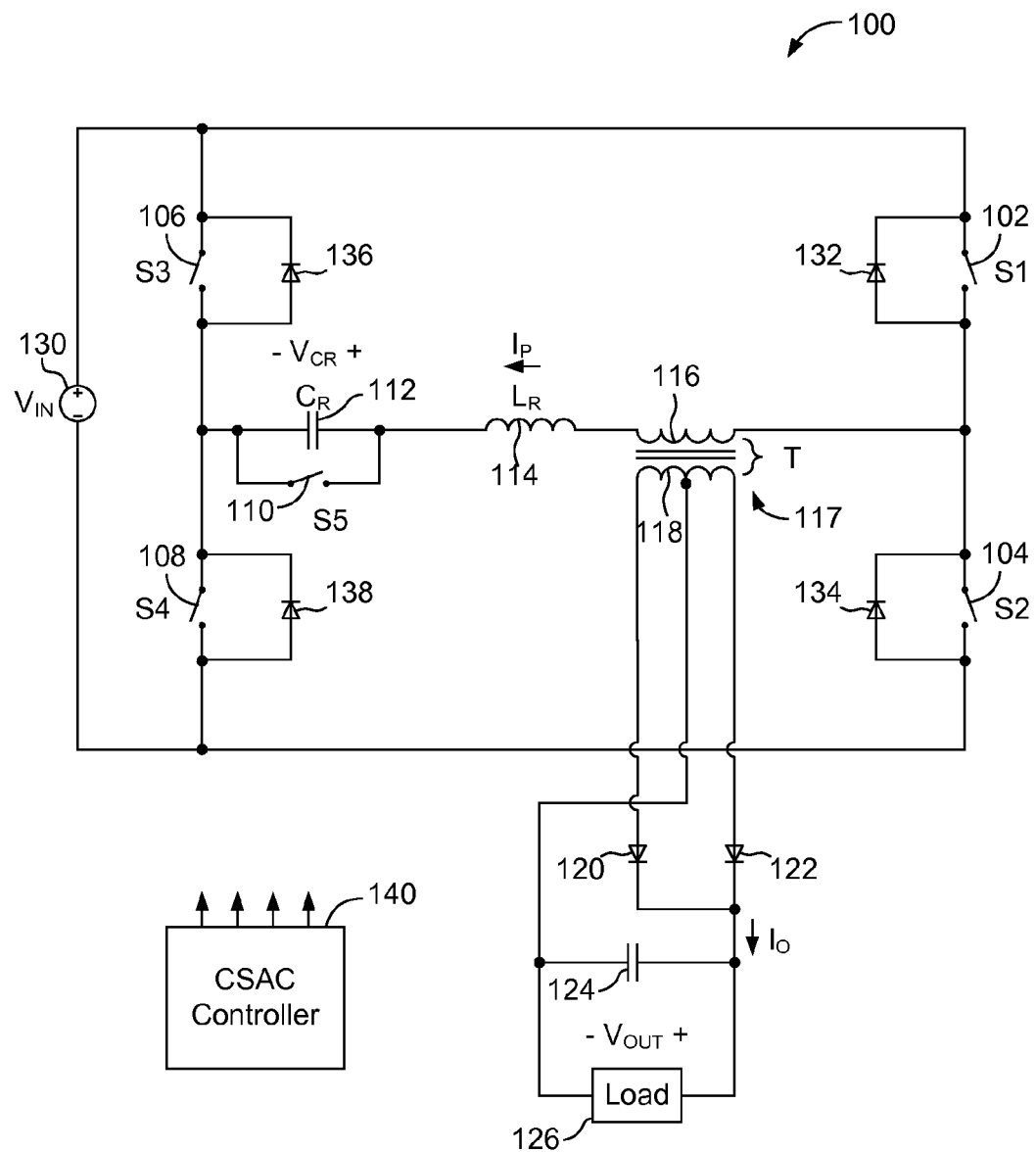
FIG. 1 is a schematic of a power converter according to an exemplary embodiment of the invention.

FIG. 1 shows a schematic of a Clamped Sine Amplitude Converter ("CSAC") 100 including a resonant capacitor $C_R$ 112; resonant inductor $L_R$ 114; a transformer T 117 having a primary winding 116 and secondary winding 118, the ratio of the primary turns to secondary turns defining a turns ratio, N, for the transformer; a clamp switch S5 110 connected across resonant capacitor $C_R$; primary switches S1 102, S2 104, S3 106 and S4 108, each of which includes a respective diode 132, 134, 136, 138 (which may be an intrinsic part of the switch, as in a MOSFET, or which may be a discrete diode connected across the switch); a full wave rectifier, comprising rectifier diodes 120, 122, connected to secondary winding 118; and an output filter capacitor 124. Resonant inductor $L_R$ may represent the leakage inductance of transformer T 117 alone or in combination with other inductances, e.g. parasitic or component inductors external to the transformer. Switch S5 may be capable of blocking a voltage of either polarity when open or carry a current of either polarity when closed. A CSAC controller 140 controls the timing of the opening and closing of the switches S1 through S5. Although shown as simple diodes in FIG. 1 for simplicity, secondary rectifiers 120, 122 may preferably be electronic switches operated as synchronous rectifiers for greater efficiency.

Figure 2A:
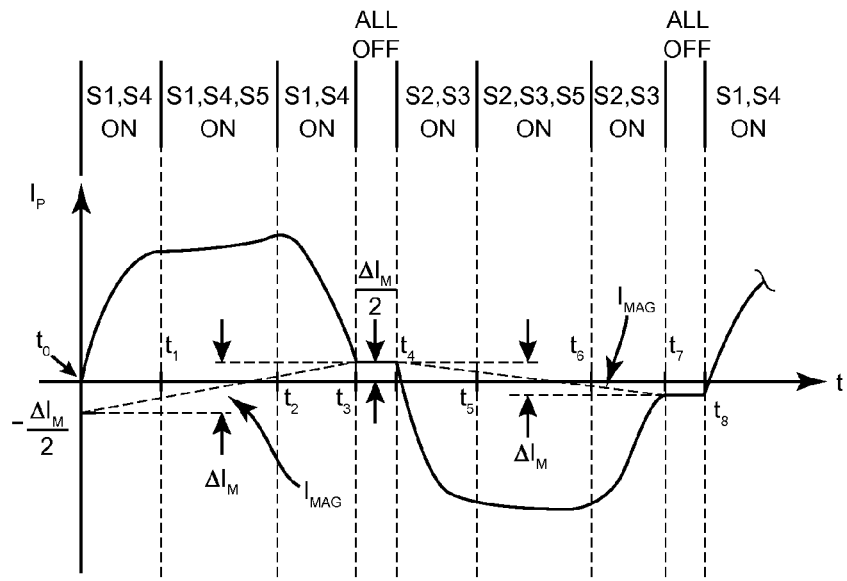
FIG. 2A-C show waveforms for the converter of FIG. 1.
Figure 2B:
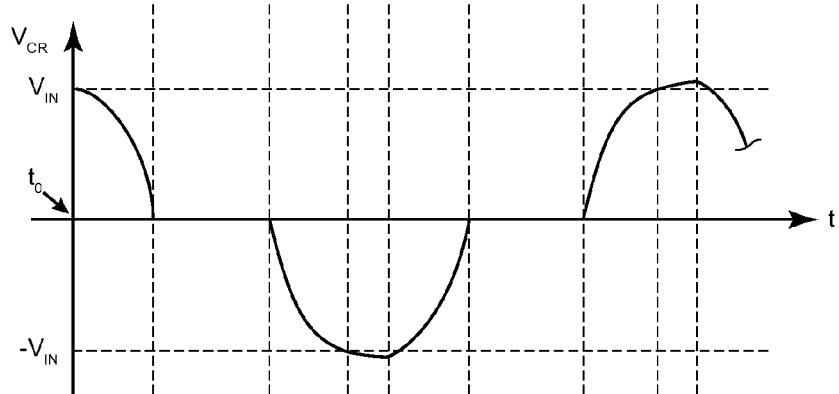
Figure 2C:
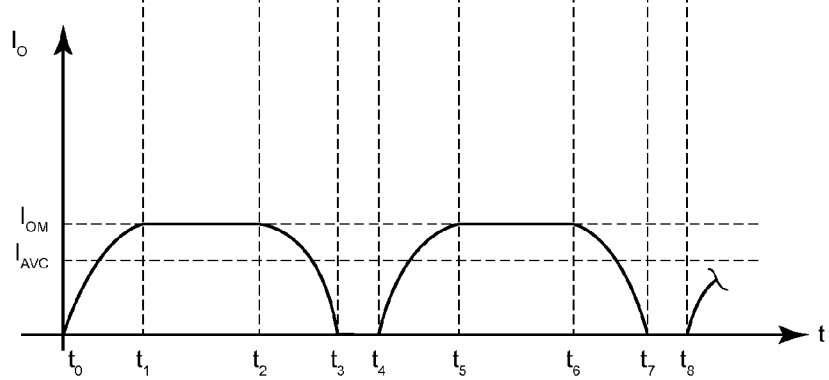

FIGS. 2A through 2C show steady-state waveforms for the CSAC of FIG. 1 operating with a constant load: FIG. 2A shows the current, $I_P$, in the primary winding 116; FIG. 2B shows the voltage, $V_{CR}$, across the resonant capacitor 112; and FIG. 2C shows the unidirectional current, $I_O$, delivered by the full-wave rectifier to the converter output. An operating cycle is shown in the FIGS. 2A through 2C beginning at time $t_0$. Just prior to $t_0$ all switches are OFF; the voltage $V_{CR}$ is at a peak positive value, Vin; and the primary current $I_P$ is substantially equal to the peak negative value of the magnetizing current, $I_P(t_0) = -\Delta I_M/2$ (the magnetizing current, $I_{MAG}(t)$ is illustrated by the dashed current waveform in FIG. 2A).

A converter operating cycle comprises two half-cycles, the first half-cycle beginning at time $t_0$ and ending at time $t_4$ and the second half-cycle beginning at time $t_4$ and ending at time $t_8$. Each half-cycle comprises a first and second resonant interval, a clamp interval and a ZVS interval. Operation of the converter during the first half-cycle is described assuming lossless circuit elements.

At time $t_0$ switches S1 and S4 are turned ON initiating a first resonant interval of the first half-cycle. Thereafter, the voltage $V_{CR}$, across resonant capacitor 112, rings down sinusoidally with a characteristic resonant frequency $f_R=1/(2*\pi*\text{sqrt}(L_R*C_R))$ and the currents $I_P$ and $I_O$ ring up sinusoidally. At time $t_1$ $V_{CR}$ reaches zero volts and $I_O$ reaches a peak value, $I_{OM}$, that is proportional to the magnitude of the average current drawn by the load 126 ($I_{AVG}$, FIG. 2C). During the first resonant interval the primary current is the sum of the reflected secondary current and the magnetizing current, $I_P(t) = I_O(t)/N + I_{MAG}(t)$.

Switch S5 is turned ON at time $t_1$, ending the first resonant interval and initiating the clamp interval of the first half-cycle. Because $V_{CR}(t_1)=0$, there is no switching loss associated with the turning ON of switch S5. During the clamp interval resonance is inhibited and the input source voltage, Vin, is impressed across primary winding 116, holding the converter output voltage $V_{OUT}=Vin/N$; the peak value of $I_O$ is essentially constant; and the primary current $I_P(t)=I_O(t)/N+I_{MAG}(t)$.

Opening of clamp switch S5 at time $t_2$ initiates a second resonant interval of the first half-cycle. Thereafter, the voltage $V_{CR}$, across resonant capacitor 112, rings down sinusoidally, with a characteristic resonant frequency $f_R=1/(2*\pi*\text{sqrt}(L_R*C_R))$, reaching its peak negative value, $-V_{IN}$, at time $t_3$, and the currents $I_P$ and $I_O$ also ring down sinusoidally. At time $t_3$ the magnitude of $I_O$ reaches zero and the primary current $I_P$ is substantially equal to the peak positive value of the magnetizing current, $I_P(t_3)=+\Delta I_M/2$.

Switches S1 and S4 are turned OFF at time $t_3$, initiating a ZVS interval of the first half-cycle. During this interval the flow of magnetizing current charges and discharges capacitances (e.g., parasitic capacitances associated with the switches and the windings). This results in a reduction in the voltage across switches S2 and S3 and an increase in the voltages across switches S1 and S4. If the magnetizing energy is sufficient, and the ZVS interval sufficiently long, S2 and S3 may be discharged to substantially zero volts and S1 and S3 charged to $+V_{IN}$, enabling S2 and S3 to be turned ON at zero voltage without switching losses associated with discharging of charged circuit capacitances.

The ZVS interval, as well as the first half-cycle, ends at time $t_4$ when the turning ON of switches S2 and S3 initiates the second half cycle. As shown in FIGS. 2A-2C, the progression of the second half-cycle between times $t_4$ and $t_8$ is the same as the progression of the first half-cycle, the difference being the polarity of the voltages and currents during the respective intervals. The full converter operating cycle ends at time $t_8$, with the completion of the ZVS interval of the second half-cycle.

Figure 3A:
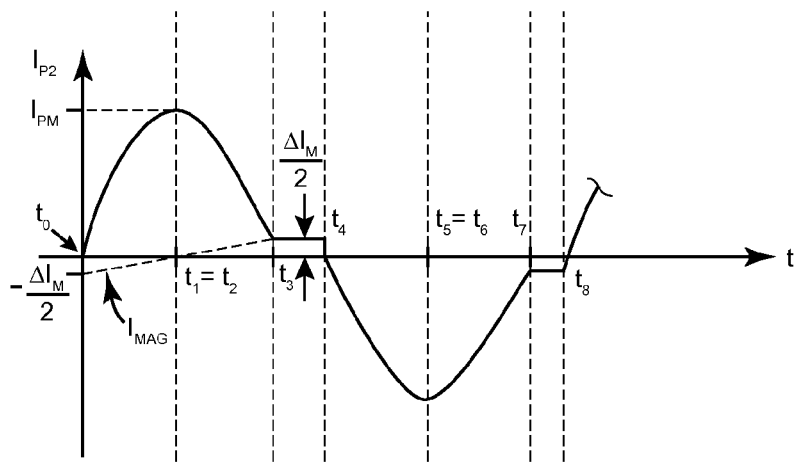
FIG. 3A-C show waveforms for a prior art SAC converter.
Figure 3B:
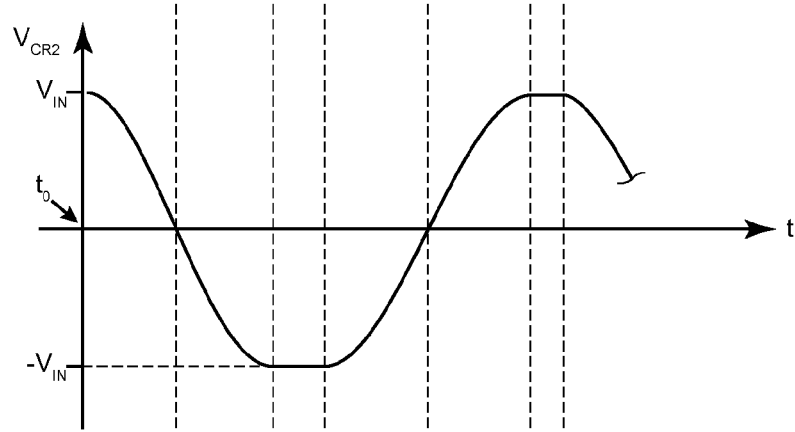
Figure 3C:
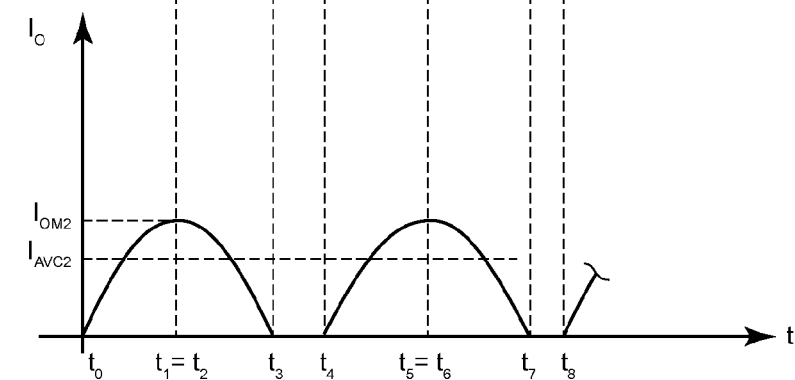

In the limit, as the clamp interval is reduced to zero (i.e., if, in FIG. 2, switch S5 is never turned ON and $t_1=t_2$ and $t_5=t_6$), the converter waveforms will be those of a conventional SAC with a characteristic resonant frequency $f_R$, as illustrated in FIGS. 3A-3C. Referring to FIG. 3, the output current, $I_O$, will comprise a series of unidirectional half-sinusoidal pulses, each pulse having a period substantially equal to $1/(2*f_R)$ and each pulse separated in time from adjacent pulses by ZVS intervals. The primary current $I_{P2}$ (FIG. 3A) is $I_{P2}(t)=I_{O2}(t)/N+I_{MAG}(t)$, where, as before, $I_{MAG}$ is the magnetizing current of transformer T 117 (illustrated by the dashed current waveform in FIG. 3A).

Inclusion of a clamp phase may enable more efficient converter operation. For example, a SAC with an operating period T and a characteristic frequency $f_{R1}$ may be compared to a CSAC with the same operating period T, but with a characteristic frequency $f_{R2} > f_{R1}$. The SAC will exhibit the waveforms of FIG. 3 with $t_8=T$; the CSAC will exhibit the waveforms of FIG. 2 with $t_8=T$. Assuming equal ZVS intervals in both converters, and assuming that each converter is delivering the same average current at the same output voltage, the rms value of the SAC secondary current will be greater than the rms value of the CSAC secondary current. Owing to the fully sinusoidal waveform in the SAC, the ratio of the rms value of $I_{O2}$ to the average value of $I_{O2}$ will be $n/(2*\text{sqrt}(2))=1.11$, whereas in the CSAC the ratio of the rms value of $I_O$ to the average value of $I_O$ will be less than 1.11, owing to the presence of the clamp interval. In a CSAC, as the length of the clamp interval increases relative to the length of the resonant intervals, the ratio of the rms value of $I_O$ to the average value of $I_O$ decreases toward unity. A similar set of arguments apply to the primary currents in the two converters. Thus, for a given average load current the losses associated with the flow of primary and secondary current may be less in a CSAC than in a SAC at the same output voltage, load and operating frequency.

Inclusion of a clamp phase also provides an additional degree of freedom in the control of a CSAC converter relative to a conventional SAC. For example, adjusting the length of the clamp interval in a CSAC as a function of load may enable the CSAC to operate with better operating efficiency over a wide range of loads relative to the efficiency that might be achieved in a SAC over the same range of loads. In a SAC, for example, optimizing converter efficiency at maximum load may be achieved by making the ZVS intervals, during which power transfer does not take place, short relative to the converter operating period, thereby maximizing the fraction of time during an operating cycle that power is being transferred to the load. To minimize switching losses with a short ZVS interval requires a relatively large peak value of magnetizing current ($\Delta I_M/2$, FIG. 3A). Because $\Delta I_M$ is essentially constant and independent of load in a SAC, the contribution of loss due to magnetizing current, relative to overall converter losses, will increase as load decreases.

In a CSAC, the length of the clamp interval may be adaptively controlled. For example, the controller 140 in FIG. 1 may directly or indirectly sense or estimate the output current using known techniques and increase the duration of the clamp phase in response to increases in output current or load power, and conversely decrease the duration of the clamp phase in response to reductions in output current or load power. Decreasing the clamp interval will decrease the peak magnetizing current and associated losses; increasing the duration of the ZVS interval will provide more time for the reduced magnetizing current to discharge circuit capacitances. In this way, it may be possible to achieve high CSAC operating efficiency at maximum load with a large $\Delta I_M$ and a short ZVS interval while also maintaining higher efficiencies at lower loads than can be achieved in a conventional SAC with a small $\Delta I_M$ and a long ZVS interval.

Preferably, reductions in the duration of the clamp interval may be offset by increases in the duration of the ZVS intervals, allowing the converter operating frequency to remain essentially constant as the load varies. For example, the characteristic resonant period (Tr=1/fr) of the CSAC may be set to be much less than the desired operating period of the CSAC at full load, e.g. the operating period at full load, $T_{O\text{-}full\text{-}load}$, may be set approximately equal to the sum of the resonant period, Tr, and twice the maximum clamp interval: $T_{O\text{-}full\text{-}load}=Tr+2*T_{clamp\text{-}full\text{-}load}$. Additionally, the magnetizing current of the transformer at no load may be set to establish ZVS intervals each having a duration of approximately $ZVS_{No\text{-}Load}=(To-Tr)/2$. In one example, a nominally 1 MHz CSAC may have a resonant period, Tr=200 nS, and the magnetizing inductance set to establish ZVS intervals at no load that each last 400 nS yielding a no load operating period, $T_{O\text{-}no\text{-}load}=1000$ nS (200 nS Tr+2*400 nS ZVS intervals+2*0 nS clamp intervals=1,000 nS). At full load with clamp phases each having a duration of approximately 300 nS, the magnetizing current in the transformer will be approximately four times greater than at no load, thus reducing the ZVS intervals by a factor of four from 400 nS to approximately 100 nS at full load yielding an operating period of 1,000 nS ($T_{O\text{-}Full\text{-}Load}=200$ nS Tr+2*100 nS ZVS intervals+2*300 nS clamp intervals=1,000 nS). Thus, the operating frequency of the converter may be held essentially constant over a wide range of load conditions.

Other adaptive control strategies are also possible. For example the controller may reduce or eliminate the duration of the clamp interval as a current limiting technique during startup for capacitive loads.

For the purposes of the present disclosure, values may be considered "equal," "substantially equal," "essentially equal," "at or near" one another, etc. when the values are exactly equal to or nearly equal to one another. In some embodiments, the values may be considered equal or nearly equal if the values are within a threshold of one another. For example, two intervals may be considered to have essentially equal duration if the intervals are within a threshold duration of one another (e.g., a tenth of a second, a hundredth of a second, a millisecond, etc.). In another example, a voltage, current, or other value may be "at or near" zero (or any other value) if the voltage/current is within a threshold value of zero (e.g., within a hundredth of an amp, a milliamp, a hundredth of a volt, a millivolt, etc.). In another example, for the purpose of zero voltage switching or zero current switching, the switch voltage or current may be considered to be at or near zero if it has been significantly reduced from the typical peak value (e.g., reduced to 5 percent, 10 percent, 20 percent, or less of the peak voltage or current).

A number of embodiments of the invention have been described. Nevertheless, it will be understood that various modifications may be made without departing from the spirit and scope of the invention. For example, a wide variety of converter topologies and control techniques may be used. The clamp switch may comprise a plurality of switches configured to shunt the resonant capacitor when activated. The output current may increase during the clamp phase due to increases in magnetizing current in other converter topologies.

The disclosure is described above with reference to drawings. These drawings illustrate certain details of specific embodiments that implement the systems, apparatus, and/or methods of the present disclosure. However, describing the disclosure with drawings should not be construed as imposing on the disclosure any limitations that may be present in the drawings. No claim element herein is to be construed as a "means plus function" element unless the element is expressly recited using the phrase "means for." Furthermore, no element, component or method step in the present disclosure is intended to be dedicated to the public, regardless of whether the element, component or method step is explicitly recited in the claims.

It should be noted that although the disclosure provided herein may describe a specific order of method steps, it is understood that the order of these steps may differ from what is described. Also, two or more steps may be performed concurrently or with partial concurrence. It is understood that all such variations are within the scope of the disclosure.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated.

What is claimed is:

1. A method of converting power between an input source and a load, where the load may vary over a normal operating range, comprising:
   providing a transformer;
   forming a resonant circuit including the transformer and a resonant capacitor and having a characteristic resonant frequency and period;
   providing output circuitry connected to the transformer for delivering a rectified output voltage to the load;
   providing two or more primary switches to drive the resonant circuit;
   providing a clamp switch to clamp the resonant capacitor;
   providing a switch controller to operate the primary switches and the clamp switch in a series of converter operating cycles, each converter operating cycle characterized by:
   (a) two power transfer intervals of essentially equal duration during which one or more of the primary switches are ON, a magnetizing current flows in a winding of the transformer, and power is transferred between the input and the output via the transformer, each power transfer interval comprising:
- (i) first and second resonant intervals, each having a duration less than the characteristic resonant period, during which a resonant current flows through a winding of the transformer at the characteristic resonant frequency; and
- (ii) a clamp interval occurring after the first resonant interval and before the second resonant interval and having a clamp duration during which the clamp switch is ON and provides a low impedance shunt across the resonant capacitor.

2. The method of claim 1 wherein the converter operating cycles further comprise one or more energy-recycling intervals, during which the primary switches are OFF and currents in the converter are used to charge and discharge capacitances in the converter.

3. The method of claim 2 wherein the energy recycling intervals further comprise a duration which may be adjusted by adjusting the clamp duration.

4. The method of claim 3 wherein the duration of the energy recycling intervals may be adjusted as a function of the power delivered to the load.

5. The method of claim 4 wherein the duration of the energy recycling intervals may be increased in response to a decrease in the power delivered to the load.

6. The method of claim 1 wherein the switch controller adjusts the clamp duration.

7. The method of claim 6 wherein the switch controller adjusts the clamp duration as a function of power delivered to the load.

8. The method of claim 7 wherein the clamp duration is reduced in response to a decrease in the power delivered to the load.

9. A method for improving the efficiency of a Sine Amplitude Converter of the kind which comprises switches for driving a resonant circuit comprising a resonant capacitor, the resonant circuit having a characteristic resonant frequency and period, and which delivers an output current comprising a series of resonant unidirectional output current pulses, each pulse having a period substantially equal to one-half of the characteristic resonant period, the method comprising:
- providing a clamp switch connected to shunt the resonant capacitor; and
- providing a controller to operate the switches and the clamp switch to extend the period of each unidirectional output current pulse by providing a non-resonant clamp interval, having a clamp duration, during the output current pulse;
- the controller operating the switches and the clamp switch in a series of converter operating cycles, each converter operating cycle characterized by:
  - (a) two power transfer intervals of essentially equal duration during which one or more of a plurality of primary switches driving the resonant circuit are ON, a magnetizing current flows in a winding of a transformer, and power is transferred between an input source and an output circuit via the transformer, each power transfer interval comprising:
    - (i) first and second resonant intervals, each having a duration less than the characteristic resonant period, during which a resonant current flows through a winding of the transformer at the characteristic resonant frequency; and
    - (ii) a clamp interval occurring after the first resonant interval and before the second resonant interval and having a clamp duration during which the clamp switch is ON and provides a low impedance shunt across the resonant capacitor.

10. The method of claim 9 further comprising:
turning the clamp switch ON at a time when the voltage across the resonant capacitor is at or near zero volts to provide a low impedance shunt across the resonant capacitor for the clamp duration.

11. A power conversion apparatus for converting power between an input source and a load, where the load may vary over a normal operating range, comprising:
- a transformer;
- a resonant circuit including the transformer and a resonant capacitor and having a characteristic resonant frequency and period;
- output circuitry connected to the transformer for delivering a rectified output voltage to the load;
- two or more primary switches to drive the resonant circuit;
- a clamp switch to clamp the resonant capacitor; and
- a switch controller to operate the primary switches and the clamp switch in a series of converter operating cycles, each converter operating cycle comprising:
  - (a) two power transfer intervals of essentially equal duration during which one or more of the primary switches are ON, a magnetizing current flows in a winding of the transformer, and power is transferred between the input and the output via the transformer, each power transfer interval comprising:
    - (i) first and second resonant intervals, each having a duration less than the characteristic resonant period, during which a resonant current flows through a winding of the transformer at the characteristic resonant frequency; and
    - (ii) a clamp interval occurring after the first resonant interval and before the second resonant interval and having a clamp duration during which the clamp switch is ON and provides a low impedance shunt across the resonant capacitor.

12. The power conversion apparatus of claim 11 wherein the converter operating cycles further comprise one or more energy-recycling intervals during which the primary switches are OFF and currents in the converter are used to charge and discharge capacitances in the converter.

13. The power conversion apparatus of claim 12 wherein the switch controller is configured to adjust the duration of the energy recycling interval by adjusting the clamp duration.

14. The power conversion apparatus of claim 13 wherein the switch controller is configured to adjust the duration of the energy recycling interval as a function of the power delivered to the load.

15. The power conversion apparatus of claim 14 wherein the switch controller is configured to increase the duration of the energy recycling interval in response to a decrease in the power delivered to the load.

16. The power conversion apparatus of claim 11 wherein the switch controller is configured to adjust the clamp duration.

17. The power conversion apparatus of claim 16 wherein the switch controller is configured to adjust the clamp duration as a function of power delivered to the load.

18. The power conversion apparatus of claim 17 wherein the switch controller is configured to reduce the clamp duration in response to a decrease in the power delivered to the load.

19. A method of converting power between an input source and a load, where the load may vary over a normal operating range, comprising:

forming a resonant circuit including an inductor and a resonant capacitor and having a characteristic resonant frequency and period;

providing output circuitry connected to the resonant circuit for delivering a rectified output voltage to the load;

providing a primary switch to drive the resonant circuit;

providing a clamp switch to clamp the resonant capacitor;

providing a switch controller to operate the primary switch and the clamp switch in a series of converter operating cycles, each converter operating cycle characterized by:

(a) one or more power transfer intervals each having (i) a first and a second resonant interval, each having a duration less than the characteristic resonant period, during which a resonant current flows through the inductor at the characteristic resonant frequency and power is transferred between the input and the output via the resonant circuit; and (ii) a clamp interval, having a clamp duration, during which the clamp switch is ON and provides a low impedance shunt across the resonant capacitor and power is transferred between the input and the output via the inductor.

20. A method of converting power between an input source and a load, where the load may vary over a normal operating range, comprising:

forming a resonant circuit including an inductor and a resonant capacitor and having a characteristic resonant frequency and period;

providing output circuitry connected to the resonant circuit for delivering a rectified output voltage to the load;

providing a primary switch to drive the resonant circuit;

providing a clamp switch to clamp the resonant capacitor;

providing a switch controller to operate the primary switch and the clamp switch in a series of converter operating cycles, each converter operating cycle characterized by:

(a) one or more power transfer intervals each having (i) a first resonant interval, having a duration approximately equal to one quarter of the characteristic resonant period, during which a resonant current flows through the inductor at the characteristic resonant frequency and power is transferred between the input and the output via the resonant circuit; and (ii) a clamp interval, having a clamp duration, during which the clamp switch is ON and provides a low impedance shunt across the resonant capacitor and power is transferred between the input and the output via the inductor.

21. A method of converting power between an input source and a load, where the load may vary over a normal operating range, comprising:

forming a resonant circuit including an inductor and a resonant capacitor and having a characteristic resonant frequency and period;

providing output circuitry connected to the resonant circuit for delivering an output current at a unipolar voltage to the load;

providing a primary switch to drive the resonant circuit;

providing a clamp switch to clamp the resonant capacitor;

providing a switch controller to operate the primary switch and the clamp switch in a series of converter operating cycles, each converter operating cycle characterized by:

(a) one or more power transfer intervals each having (i) a first resonant interval, having a duration less than the characteristic resonant period, during which the output current changes sinusoidally from zero to a first value at the characteristic resonant frequency; and (ii) a clamp interval immediately following the first resonant interval, having a clamp duration, during which the clamp switch is ON and provides a low impedance shunt across the resonant capacitor, and the output current continues to flow.

22. The method of claim 21 wherein the output current changes from the first value at the beginning of the clamp interval to a second value at the end of the clamp interval.

23. The method of claim 22 wherein the first value is essentially equal to the second value.

24. The method of claim 23 wherein each power transfer interval further comprises (iii) a second resonant interval, having a duration less than the characteristic resonant period, during which the output current changes sinusoidally from the second value to zero at the characteristic resonant frequency.

25. The method of claim 22 wherein the first value is less than the second value.

* * * * *